(12) United States Patent
Miao et al.

(10) Patent No.: US 12,460,465 B2
(45) Date of Patent: Nov. 4, 2025

(54) STORAGE DEVICE

(71) Applicants: QINGDAO HAIER REFRIGERATOR CO., LTD., Shandong (CN); HAIER SMART HOME CO., LTD., Shandong (CN)

(72) Inventors: Jianlin Miao, Qingdao (CN); Yihao Xu, Qingdao (CN); Xueli Cheng, Qingdao (CN); Ming Wang, Qingdao (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 322 days.

(21) Appl. No.: 18/245,032

(22) PCT Filed: Aug. 31, 2021

(86) PCT No.: PCT/CN2021/115697
§ 371 (c)(1),
(2) Date: Mar. 13, 2023

(87) PCT Pub. No.: WO2022/052837
PCT Pub. Date: Mar. 17, 2022

(65) Prior Publication Data
US 2023/0340827 A1     Oct. 26, 2023

(30) Foreign Application Priority Data
Sep. 14, 2020 (CN) .......................... 202010961909.9

(51) Int. Cl.
*E05F 15/611* (2015.01)
*E05F 5/06* (2006.01)
*F25D 23/02* (2006.01)

(52) U.S. Cl.
CPC .............. *E05F 15/611* (2015.01); *E05F 5/06* (2013.01); *E05Y 2201/11* (2013.01);
(Continued)

(58) Field of Classification Search
CPC ...... F25D 23/062; F25D 23/065; F25D 23/02; F25D 23/028; F25D 29/00; F25D 29/003;
(Continued)

(56) References Cited

U.S. PATENT DOCUMENTS 6,338,536 B1    1/2002   Ueno et al.
7,014,283 B2 *   3/2006   Grace ................... F25D 23/062
                                                                                    312/406

(Continued)

FOREIGN PATENT DOCUMENTS

CN       108692511 A      10/2018
CN       109373688 A *   2/2019  ............. F25D 23/02

(Continued)

OTHER PUBLICATIONS

International Search Report and Written Opinion for PCT/CN2021/115697 (ISA/CN) mailed Nov. 29, 2021 w/English translation (9 pages).

(Continued)

*Primary Examiner* — Andrew Roersma
(74) *Attorney, Agent, or Firm* — toutman pepper locke; Tim Tingkang Xia, Esq.

(57) ABSTRACT

Disclosed is a storage device. The storage device comprises a box body, at least one door body and an automatic door-opening assembly for opening the at least one door body. The automatic door-opening assembly comprises a housing and at least one automatic door-opening device. The housing is fixedly connected to the box body. Each automatic door-opening device is at least partially provided on a side, close to the box body, of the housing, and is fixedly (Continued)

connected to the housing, so as to fix the at least one automatic door-opening device. In the storage device of the present invention, the automatic door-opening device is first fixed to the housing to form an integrated assembly, and then the assembly is fixedly connected to the box body.

14 Claims, 7 Drawing Sheets

(52) U.S. Cl.
CPC ......... *E05Y 2900/31* (2013.01); *F25D 23/028* (2013.01); *F25D 2323/021* (2013.01)

(58) Field of Classification Search
CPC ............. F25D 29/005; F25D 2323/021; F25D 2323/024; E05F 15/611; E05F 5/06
See application file for complete search history.

(56) References Cited

U.S. PATENT DOCUMENTS

| | | | | |
|---|---|---|---|---|
| 10,202,792 | B2* | 2/2019 | Kim | E05F 15/619 |
| 10,753,669 | B2* | 8/2020 | Dherde | F25D 23/065 |
| 10,907,883 | B2* | 2/2021 | Dherde | E05D 7/081 |
| 11,073,327 | B2* | 7/2021 | Kim | F25D 23/028 |
| 11,466,498 | B2* | 10/2022 | Lee | E05F 15/619 |
| 11,486,629 | B2* | 11/2022 | Harikrishnasamy | F25D 23/066 |
| 2008/0083243 | A1 | 4/2008 | Lee et al. | |
| 2009/0169387 | A1* | 7/2009 | Yoo | F04D 29/646 416/190 |
| 2011/0048060 | A1* | 3/2011 | Kim | E05B 17/0029 62/449 |
| 2016/0245579 | A1* | 8/2016 | Eom | E05F 5/02 |
| 2019/0169910 | A1 | 6/2019 | Im et al. | |
| 2021/0108694 | A1* | 4/2021 | Mayer | F16F 1/377 |

FOREIGN PATENT DOCUMENTS

| | | | | |
|---|---|---|---|---|
| CN | 209761161 | | 12/2019 | |
| CN | 212378317 | U | 1/2021 | |
| JP | H 11-333762 | | 12/1999 | |
| JP | 2003302151 | A | 10/2003 | |
| JP | 2005-003320 | A | 1/2005 | |
| JP | 2007178078 | A | 7/2007 | |
| JP | 2021-009008 | A | 1/2021 | |
| KR | 1020180113159 | A * | 10/2018 | ............ E05F 15/616 |
| KR | 1020190070626 | A * | 6/2019 | ............ F25D 23/02 |

OTHER PUBLICATIONS

1st Examination Report for Australian Patent Application No. 2021341853 dated Jan. 24, 2024 (3 pages).
1st Office Action for European Patent Application No. 21865892.0 dated Jan. 8, 2024 (5 pages).
Supplementary European Search Report for European Patent Application No. 21865892.0 dated Dec. 19, 2023 (4 pages).
Decision to Grant a Patent for Japanese Patent Application No. 2023-515714 dated Dec. 19, 2023 (6 pages).

* cited by examiner

STORAGE DEVICE

CROSS-REFERENCE TO RELATED APPLICATIONS

The present application is a national phase entry of International Application No. PCT/CN2021/115697, filed Aug. 31, 2021, which claims priority to Chinese Application No. 202010961909.9, filed Sep. 14, 2020, which is are each incorporated herein by reference in its entirety.

FIELD OF THE INVENTION

The present invention relates to a storage device, and particularly to a storage device with an automatic door-opening device.

BACKGROUND OF THE INVENTION

A large refrigerator has a heavy door body, a door gasket has a large suction force, and in order to solve the problem that a user cannot open the door body easily, in the prior art, an automatic door-opening device is provided on a box body of the refrigerator to help the user open the door body. However, fixation of the automatic door-opening device requires that a mounting box is preset before the box body is foamed, and then, the automatic door-opening device is fixed in the mounting box. The arrangement of the mounting box reduces the thickness of a foamed heat insulation layer of the refrigerator to reduce the heat insulation performance of the box body, and requires that holes are punched in an outer box of the box body in advance to position and mount the automatic door-opening device and the mounting box, the process is complex, and the production cost is high. In view of this, in design, it is desirable to provide a storage device with an automatic door-opening device, which has a simple process and a stable and reliable structure.

BRIEF DESCRIPTION OF THE INVENTION

An object of the present invention is to overcome at least one of the technical drawbacks of the prior art and provide a storage device with an automatic door-opening device.

A further object of the present invention is to make a process simple.

Another object of the present invention is to improve the stability of the automatic door-opening device.

In particular, the present invention provides a storage device, including:
a box body and at least one door body; and
an automatic door-opening assembly for opening the at least one door body, the automatic door-opening assembly including:
a housing fixedly connected to the box body; and
at least one automatic door-opening device, each automatic door-opening device being at least partially provided on a side, close to the box body, of the housing, and fixedly connected to the housing, so as to fix the at least one automatic door-opening device.

Optionally, the automatic door-opening assembly further includes:
a plurality of fasteners configured to fixedly connect the at least one automatic door-opening device to the housing and to fixedly connect the housing to the box body;
the at least one automatic door-opening device is fixed to the housing by the fasteners in a direction away from the box body; and
the housing is fixed to the box body by the fasteners in a direction close to the box body.

Optionally, each automatic door-opening device is provided with a plurality of through holes; and
the housing is provided with a plurality of connecting protrusions extending towards the box body, and each connecting protrusion is configured to penetrate through one through hole, wherein the fasteners are configured to be fastened to the connecting protrusions.

Optionally, the automatic door-opening assembly further includes:
a plurality of elastic washers provided between the plurality of connecting protrusions and the plurality of through holes respectively; each elastic washer including:
two damping portions provided at the peripheral edge of the through hole close to the box body and the peripheral edge of the through hole close to the housing respectively; and
a connecting portion provided in the through hole and connected with the two damping portions.

Optionally, each elastic washer further includes:
a plurality of spherical protrusions provided on the two damping portions respectively and protruding in a direction away from the connecting portion.

Optionally, the automatic door-opening assembly further includes:
a plurality of limiting clamping sheets which are clamped and fixed at end portions, close to the box body, of the plurality of connecting protrusions fixedly connected with the box body, and limit the motion of the at least one automatic door-opening device in the axial direction of the through hole.

Optionally, each automatic door-opening device includes:
a motor configured to provide a driving force for opening the door body; and
a side wall of the housing away from the box body is provided with at least one avoiding hole, and part of each motor is provided in one avoiding hole.

Optionally, the automatic door-opening assembly further includes:
at least one sealing ring provided between the at least one avoiding hole and the at least one motor.

Optionally, the box body includes:
an outer box, a liner and a heat insulation layer provided between the outer box and the liner; and
a metal reinforcement provided between the outer box and the heat insulation layer, the housing being configured to be at least fixedly connected with the metal reinforcement.

Optionally, the housing is configured to cover at least one hinge device connecting the box body and the at least one door body; and
one of the metal reinforcement and the housing is provided with a plurality of positioning protrusions, the other of the metal reinforcement and the housing is provided with a plurality of annular protrusions, and the plurality of positioning protrusions are provided in inner rings of the plurality of annular protrusions respectively, so as to restrict the motion of the housing in the radial direction of the annular protrusions.

In the storage device of the present invention, the automatic door-opening device is first fixed to the housing to form an integrated assembly, and then the assembly is fixedly connected to the box body, the assembling is simple, and the invention is applicable to storage devices with different widths, the universality is strong, the influence of the production line process is small, and the production cost is reduced.

Further, the automatic door-opening device in the present invention is fixed to the housing by the fasteners in the direction away from the box body, and the housing covers the hinge device for connecting the box body and the door body, thereby breaking through the conventional thought that the automatic door-opening device is nailed towards the box body, simplifying the production flow and further reducing the production cost.

Further, in the present invention, the limiting clamping sheet is clamped and fixed at the end portion, close to the box body, of the connecting protrusion fixedly connected with the box body, and the elastic washer is provided between each connecting protrusion and the through hole, such that the automatic door-opening device and the housing are fixed more stably and reliably; after the housing is fixed to the box body, the automatic door-opening device and the box body are kept at stable relative positions, thus avoiding failure of the automatic door-opening device.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1:
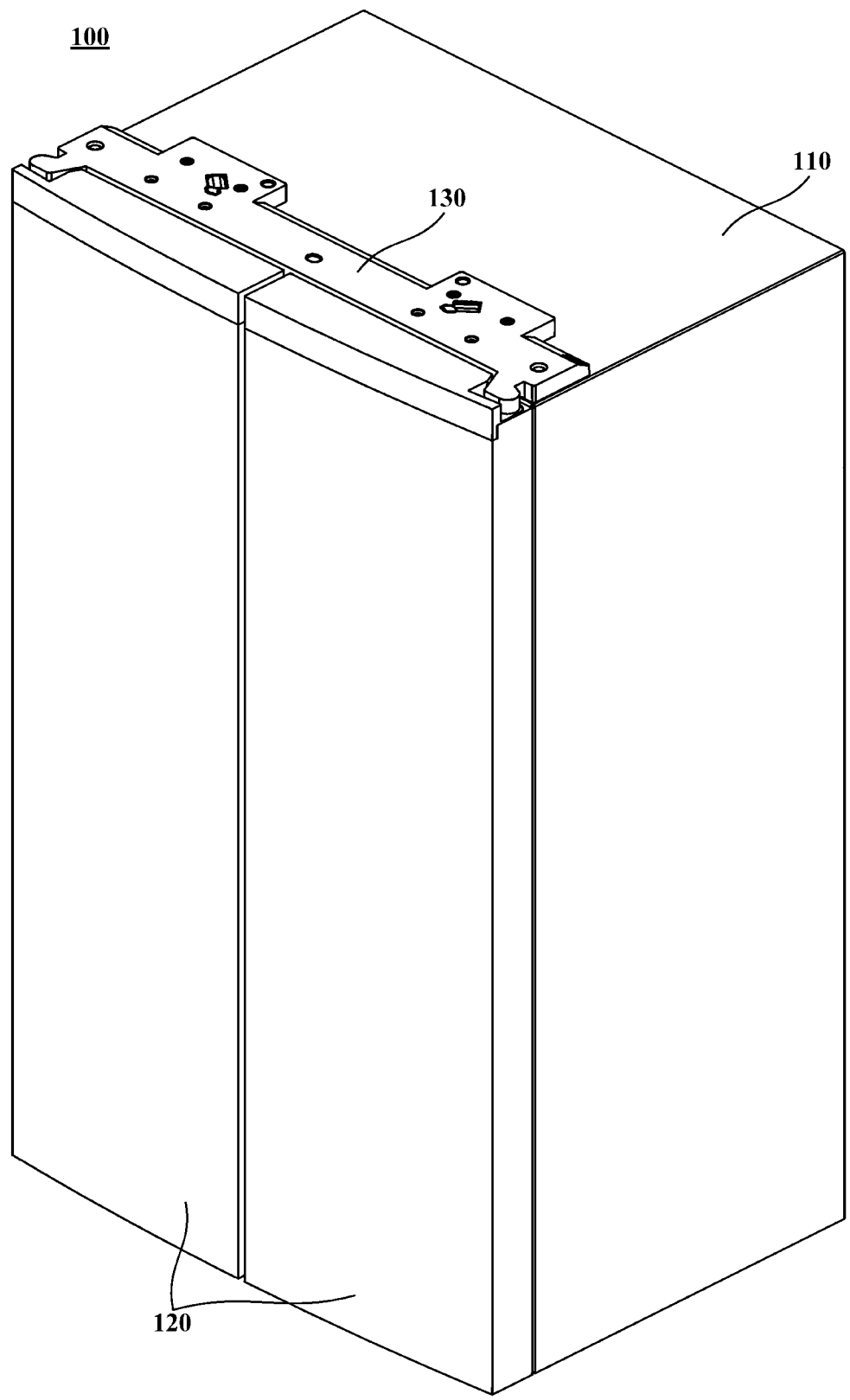
FIG. 1 is a schematic isometric diagram of a storage device according to an embodiment of the present invention.
Figure 2:
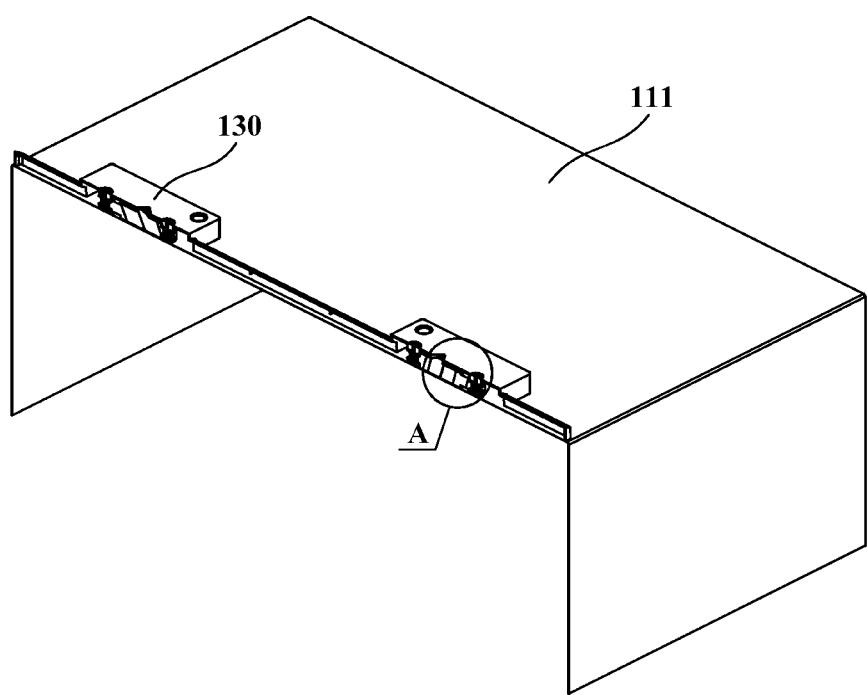
FIG. 2 is a schematic partial sectional diagram of the storage device shown in FIG. 1 taken along a vertical plane.
Figure 3:
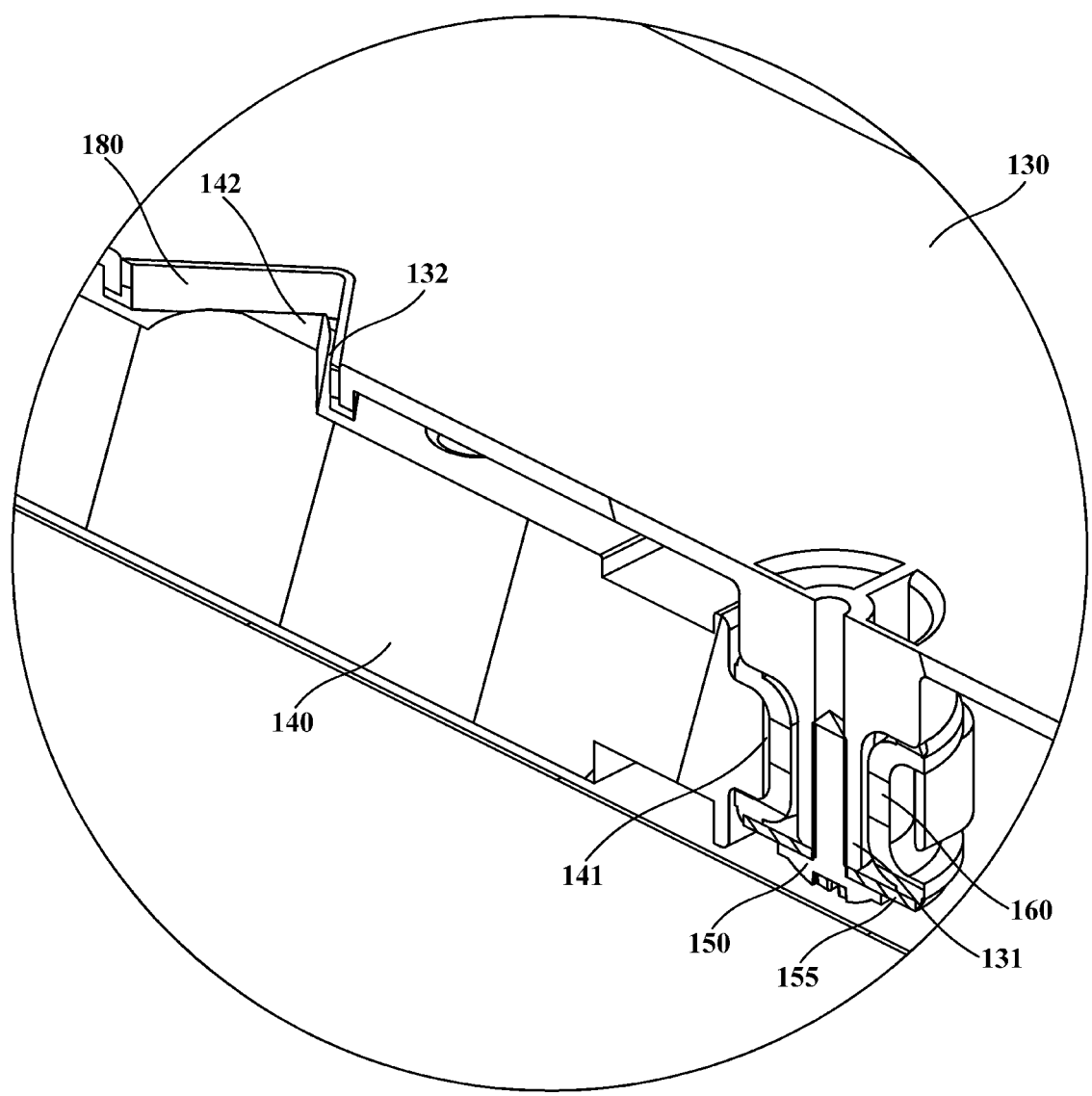
FIG. 3 is a schematic enlarged diagram of region A in FIG. 2.

FIG. 1 is a schematic isometric diagram of a storage device 100 according to an embodiment of the present invention; FIG. 2 is a schematic partial sectional diagram of the storage device 100 shown in FIG. 1 taken along a vertical plane; FIG. 3 is a schematic enlarged diagram of region A in FIG. 2. Referring to FIGS. 1 to 3, the storage device 100 may include a box body 110 defining at least one storage compartment, at least one door body 120 for opening and closing the at least one storage compartment, and an automatic door-opening assembly for opening the at least one door body 120.

In the illustrated embodiment, the storage device 100 includes only two door bodies 120 distributed in a transverse direction. The automatic door-opening assembly is provided above the storage device 100 and used for automatically opening the two door bodies 120.

In other embodiments, the storage device 100 may include two door bodies hinged to an upper portion of the box body 110 and two door bodies hinged to a lower portion of the box body 110. Automatic door-opening assemblies can be provided above and below the storage device 100 respectively to automatically open the four door bodies.

The automatic door-opening assembly may include a housing 130 and at least one automatic door-opening device 140. In the illustrated embodiment, two automatic door-opening devices 140 may be provided to open the two door bodies 120 respectively.

Exemplarily, the automatic door-opening device 140 may include a motor 142 for providing a driving force for opening the door body 120, and a jacking rod in drive connection with the motor 142 and movable back and forth relative to the box body 110.

In particular, each automatic door-opening device 140 may be at least partially provided on a side of the housing 130 close to the box body 110 and fixedly connected to the housing 130. The housing 130 can be configured to be fixedly connected to the box body 110 to indirectly fix the automatic door-opening device 140 to the box body 110, and compared with the solution that a mounting box is preset before the box body 110 is foamed, and then, the automatic door-opening device 140 is fixed in the mounting box, assembling is simple, a pre-perforation operation is avoided, the solution can also be applicable to storage devices 100 with different widths, the universality is strong, the influence of the production line process is small, and the production cost is reduced.

The automatic door-opening assembly may further include a plurality of fasteners 150. The plurality of fasteners 150 may be configured to fixedly connect the automatic door-opening device 140 to the housing 130, and to fixedly connect the housing 130 to the box body 110. That is, some fasteners 150 may be used to fixedly connect the automatic door-opening device 140 to the housing 130, and some fasteners 150 may be used to fixedly connect the housing 130 to the box body 110.

In some embodiments, the automatic door-opening device 140 may be fixed to the housing 130 by the fasteners 150 in a direction away from the box body 110, so as to more firmly mount the automatic door-opening device 140. In the illustrated embodiment, the fasteners 150 fix the automatic door-opening device 140 to the housing 130 from bottom to top.

The housing 130 may be fixed to the box body 110 by the fasteners 150 in a direction close to the box body 110. In the illustrated embodiment, the fasteners 150 fix the housing 130 to the box body 110 from top to bottom.

Specifically, each automatic door-opening device 140 may be provided with a plurality of through holes 141. The housing 130 may be provided with a plurality of connecting protrusions 131 extending towards the box body 110, and each connecting protrusion 131 may be configured to penetrate through one through hole 141. The fasteners 150 may be configured to be fastened to the connecting protrusions 131 to improve the reliability of the automatic door-opening device 140.

Figure 4:
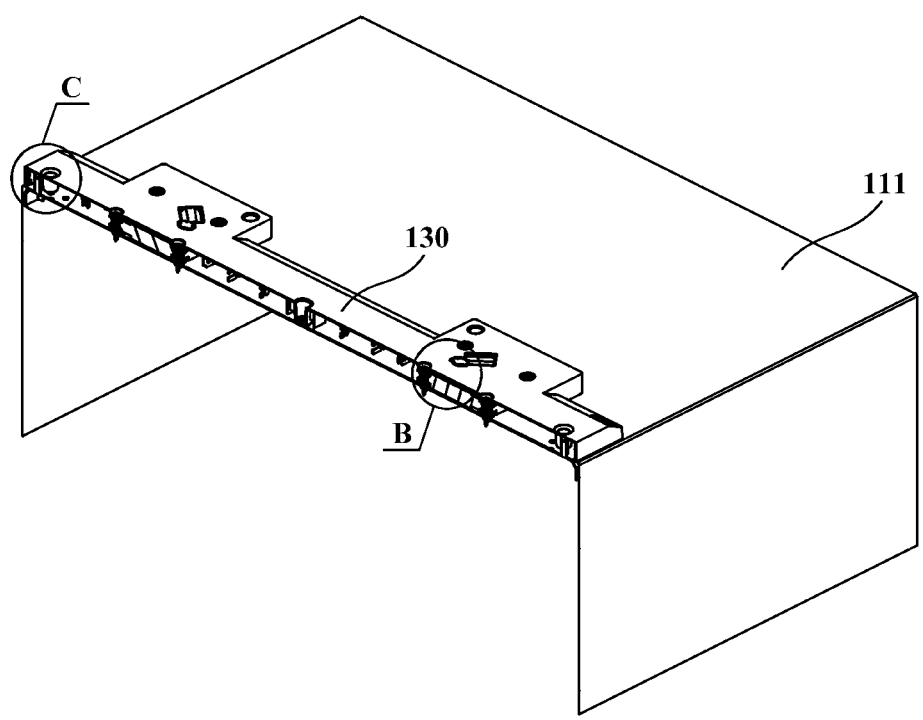
FIG. 4 is a schematic partial sectional diagram of the storage device shown in FIG. 1 taken along another vertical plane.
Figure 5:
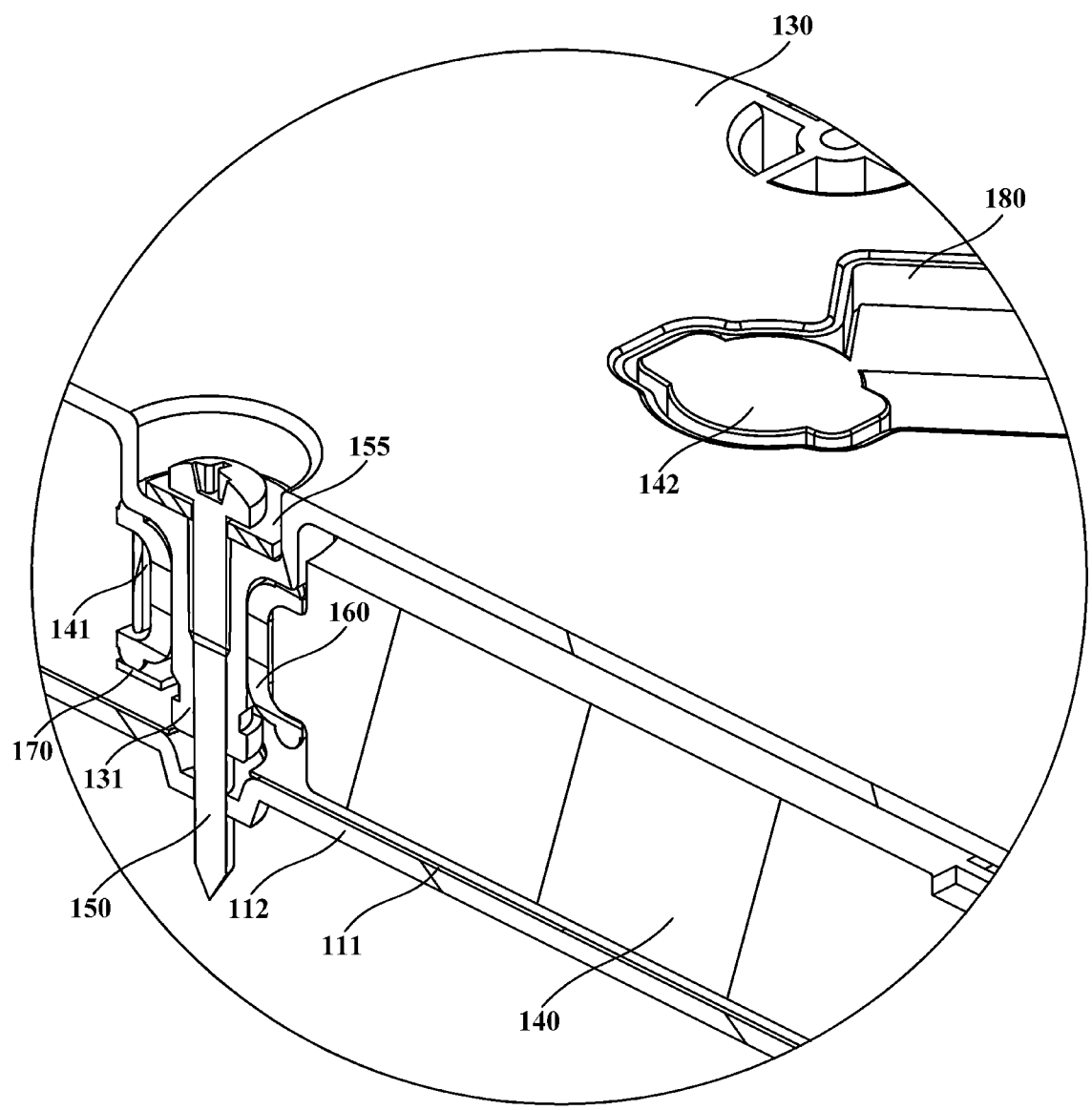
FIG. 5 is a schematic enlarged diagram of region B in FIG. 4.

FIG. 4 is a schematic partial sectional diagram of the storage device 100 shown in FIG. 1 taken along another vertical plane; FIG. 5 is a schematic enlarged diagram of region B in FIG. 4. Referring to FIGS. 3 to 5, the automatic door-opening assembly may further include a plurality of limiting clamping sheets 170.

The plurality of limiting clamping sheets 170 may be clamped and fixed at end portions, close to the box body 110, of the plurality of connecting protrusions 131 fixedly connected with the box body 110, and limit the motion of the at least one automatic door-opening device 140 in the axial direction of the through hole 141, so as to prevent the automatic door-opening device 140 from deflecting and affecting functions in the mounting process of the housing 130.

The limiting clamping sheet 170 may be annular and have a wedge-shaped mounting opening. The end portion of the connecting protrusion 131 close to the box body 110 may be provided with a mounting groove, and the limiting clamping sheet 170 may be clamped and fixed in the mounting groove through the mounting opening.

In some embodiments, the fastener 150 may directly limit the motion of the automatic door-opening device 140 and the housing 130 in the axial direction of the through hole 141 by a head thereof. In some other embodiments, the fastener 150 may limit the motion of the automatic door-opening device 140 and the housing 130 in the axial direction of the through hole 141 by a gasket 155.

Figure 6:
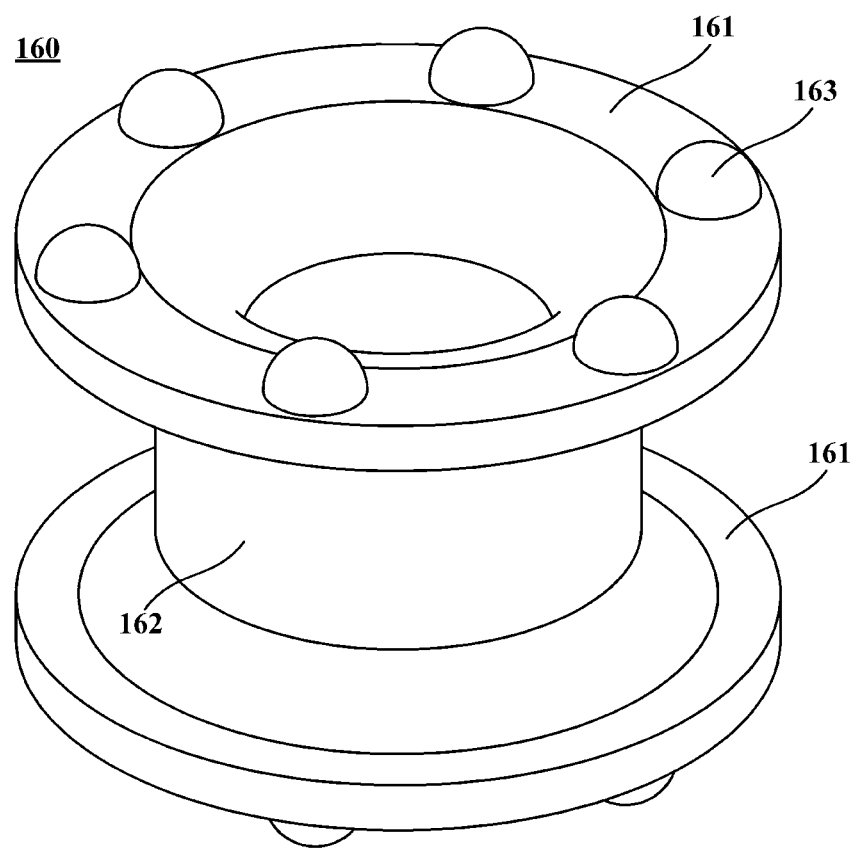
FIG. 6 is a schematic isometric diagram of an elastic washer in FIGS. 3 and 5.

FIG. 6 is a schematic isometric diagram of an elastic washer 160 in FIGS. 3 and 5. Referring to FIGS. 3, 5 and 6, in some embodiments, the automatic door-opening assembly may further include a plurality of elastic washers 160. The plurality of elastic washers 160 may be provided between the plurality of connecting protrusions 131 and the plurality of through holes 141 respectively, so as to improve the stability of the automatic door-opening device 140 and prevent the fasteners 150 from being loosened.

Each elastic washer 160 may include two damping portions 161 and one connecting portion 162. The two damping portions 161 may be provided at the peripheral edge of the through hole 141 close to the box body 110 and the peripheral edge of the through hole close to the housing 130 respectively. The connecting portion 162 may be provided in the through hole 141 and connected with the two damping portions 161.

For the through hole 141 for fixedly connecting the housing 130 and the automatic door-opening device 140, the elastic washer 160 may be provided between the housing 130 and the gasket 155. For the through hole 141 for fixedly connecting the housing 130 and the box body 110, the elastic washer 160 may be provided between the housing 130 and the limiting clamping sheet 170, such that the automatic door-opening assembly has high reliability both during transportation and after mounted to the box body 110.

In some further embodiments, each elastic washer 160 may further include a plurality of spherical protrusions 163. The plurality of spherical protrusions 163 may be provided on the two damping portions 161 respectively, and protrude in a direction away from the connecting portion 162, so as to reduce a contact area between the elastic washer 160 and the housing 130 or the limiting clamping sheet 170 or the gasket 155, and improve the damping effect. In the embodiment of FIGS. 3 and 5, some spherical protrusions 163 are in a compressed state.

Referring to FIGS. 3 and 5, at least one avoiding hole 132 may be formed on a side wall of the housing 130 away from the box body 110. Each motor 142 may be partially provided within one avoiding hole 132 to reduce the space occupied by the automatic door-opening assembly in the vertical direction.

The automatic door-opening assembly may further include at least one sealing ring 180. The at least one sealing ring 180 may be provided between the at least one avoiding hole 132 and the at least one motor 142 respectively. That is, each avoiding hole 132 is correspondingly provided with one sealing ring 180 to prevent dust from falling into the housing 130.

In the present invention, the storage device 100 may be a refrigerator. The box body 110 may include an outer box 111, a liner, and a heat insulation layer provided between the outer box 111 and the liner to reduce cold leakage.

Figure 7:
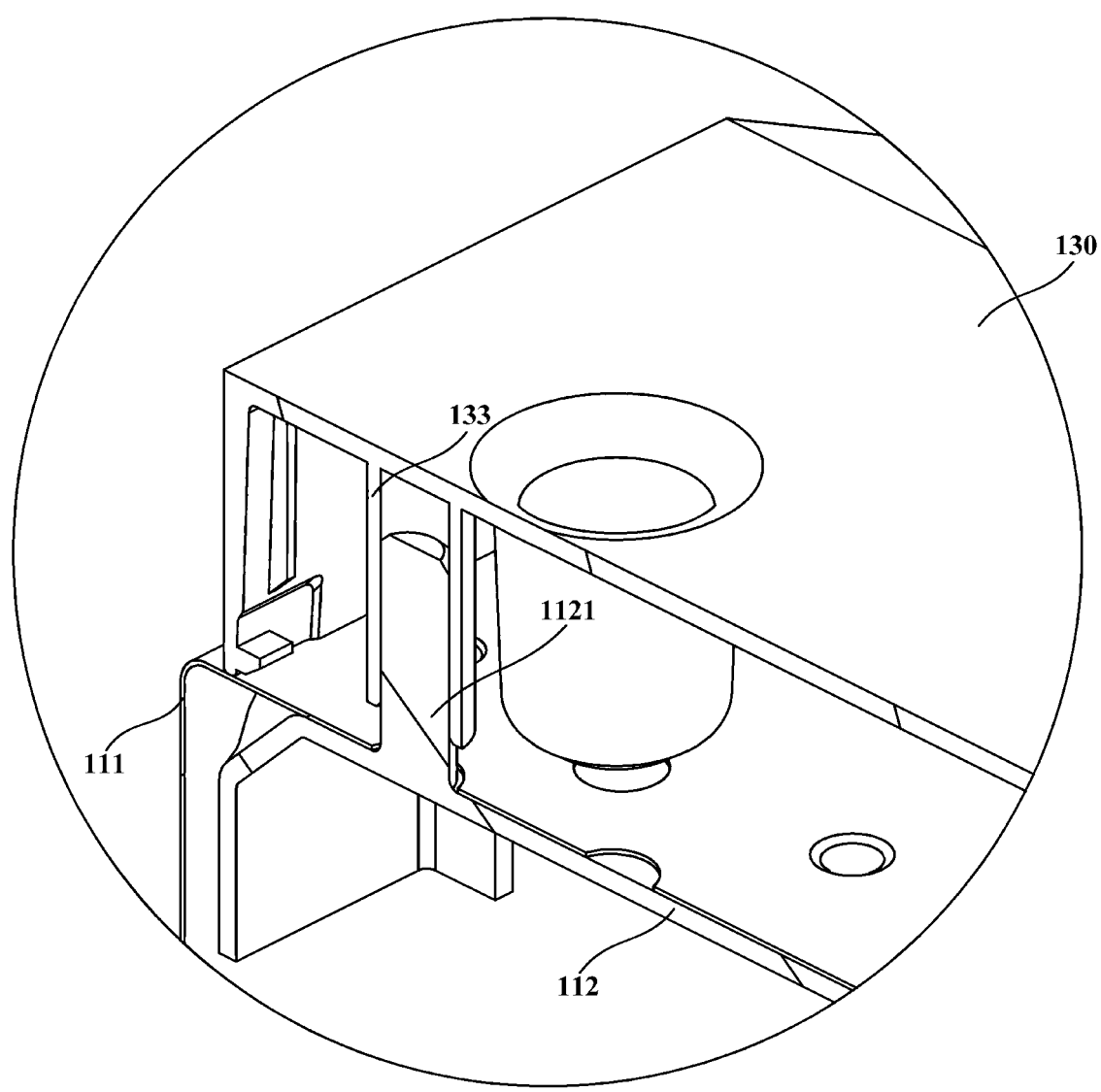
FIG. 7 is a schematic enlarged diagram of region C in FIG. 4.

FIG. 7 is a schematic enlarged diagram of region C in FIG. 4. Referring to FIGS. 5 and 7, in some embodiments, the box body 110 may further include a metal reinforcement 112 provided between the outer box 111 and the heat insulation layer. The housing 130 may be configured to be at least fixedly connected to the metal reinforcement 112 to improve the overall structural strength of the refrigerator and prevent the automatic door-opening assembly from being separated from the box body 110 due to a reaction force generated when the door body 120 is opened.

In the illustrated embodiment, the housing 130 is fixedly connected to the outer box 111, the metal reinforcement 112, and the heat insulation layer at the same time by the fasteners 150.

In some embodiments, the housing 130 can be configured to cover a hinge device connecting the box body 110 and the door body 120, so as to further simplify the process flow and save the cost.

One of the metal reinforcement 112 and the housing 130 may be provided with a plurality of positioning protrusions 1121, and the other of the metal reinforcement 112 and the housing 130 may be provided with a plurality of annular protrusions 133. The plurality of positioning protrusions 1121 are provided in inner rings of the plurality of annular protrusions 133 respectively to limit the motion of the housing 130 in the radial direction of the annular protrusions 133, so as to position the automatic door-opening assembly, thereby avoiding that the door body 120 cannot pivot or the automatic door-opening device 140 fails.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:
1. A storage device, comprising:
a box body and at least one door body; and
an automatic door-opening assembly for opening the at least one door body, the automatic door-opening assembly comprising:
a housing fixedly connected to the box body;
at least one automatic door-opening device, each said automatic door-opening device being at least partially provided on a side, close to the box body, of the housing, and fixedly connected to the housing, so as to fix the at least one automatic door-opening device; and
a plurality of fasteners configured to fixedly connect the at least one automatic door-opening device to the housing and to fixedly connect the housing to the box body;

wherein the at least one automatic door-opening device is fixed to the housing by the fasteners in a direction away from the box body;

wherein the housing is fixed to the box body by the fasteners in a direction towards the box body;

wherein each said automatic door-opening device is provided with a plurality of through holes;

wherein the housing is provided with a plurality of connecting protrusions extending towards the box body, and each said connecting protrusion is configured to penetrate through one said through hole, wherein the fasteners are configured to be fastened to the connecting protrusions;

wherein the automatic door-opening assembly further comprises:

a plurality of limiting clamping sheets which are clamped and fixed at end portions, close to the box body, of the plurality of connecting protrusions fixedly connected with the box body, and limit the motion of the at least one automatic door-opening device in the axial direction of the through hole.

2. The storage device according to claim 1, wherein the automatic door-opening assembly further comprises:

a plurality of elastic washers provided between the plurality of connecting protrusions and the plurality of through holes respectively; each said elastic washer comprising:

two damping portions provided at the peripheral edge of the through hole close to the box body and the peripheral edge of the through hole close to the housing respectively; and a connecting portion provided in the through hole and connected with the two damping portions.

3. The storage device according to claim 2, wherein each said elastic washer further comprises:

a plurality of spherical protrusions provided on the two damping portions respectively and protruding in a direction away from the connecting portion.

4. The storage device according to claim 1, wherein each said automatic door-opening device comprises:

a motor configured to provide a driving force for opening the door body; and a side wall of the housing away from the box body is provided with at least one avoiding hole, and part of each said motor is provided in one said avoiding hole.

5. The storage device according to claim 4, wherein the automatic door-opening assembly further comprises:

at least one sealing ring provided between the at least one avoiding hole and the at least one motor.

6. The storage device according to claim 1, wherein the box body comprises:

an outer box, a liner and a heat insulation layer provided between the outer box and the liner; and a metal reinforcement provided between the outer box and the heat insulation layer, the housing being configured to be at least fixedly connected with the metal reinforcement.

7. The storage device according to claim 6, wherein the housing is configured to cover at least one hinge device connecting the box body and the at least one door body; and one of the metal reinforcement and the housing is provided with a plurality of positioning protrusions, the other of the metal reinforcement and the housing is provided with a plurality of annular protrusions, and the plurality of positioning protrusions are provided in inner rings of the plurality of annular protrusions respectively, so as to restrict the motion of the housing in the radial direction of the annular protrusions.

8. A storage device, comprising:

a box body and at least one door body; and an automatic door-opening assembly for opening the at least one door body, the automatic door-opening assembly comprising:

a housing fixedly connected to the box body; and at least one automatic door-opening device, each said automatic door-opening device being at least partially provided on a side, close to the box body, of the housing, and fixedly connected to the housing, so as to fix the at least one automatic door-opening device;

wherein the box body comprises:

an outer box, a liner and a heat insulation layer provided between the outer box and the liner; and a metal reinforcement provided between the outer box and the heat insulation layer, the housing being configured to be at least fixedly connected with the metal reinforcement;

wherein the housing is configured to cover at least one hinge device connecting the box body and the at least one door body; and wherein one of the metal reinforcement and the housing is provided with a plurality of positioning protrusions, the other of the metal reinforcement and the housing is provided with a plurality of annular protrusions, and the plurality of positioning protrusions are provided in inner rings of the plurality of annular protrusions respectively, so as to restrict the motion of the housing in the radial direction of the annular protrusions.

9. The storage device according to claim 8, wherein the automatic door-opening assembly further comprises:

a plurality of fasteners configured to fixedly connect the at least one automatic door-opening device to the housing and to fixedly connect the housing to the box body;

wherein the at least one automatic door-opening device is fixed to the housing by the fasteners in a direction away from the box body;

wherein the housing is fixed to the box body by the fasteners in a direction towards the box body.

10. The storage device according to claim 9, wherein each said automatic door-opening device is provided with a plurality of through holes; and the housing is provided with a plurality of connecting protrusions extending towards the box body, and each said connecting protrusion is configured to penetrate through one said through hole, wherein the fasteners are configured to be fastened to the connecting protrusions.

11. The storage device according to claim 10, wherein the automatic door-opening assembly further comprises:

a plurality of elastic washers provided between the plurality of connecting protrusions and the plurality of through holes respectively; each said elastic washer comprising:

two damping portions provided at the peripheral edge of the through hole close to the box body and the peripheral edge of the through hole close to the housing respectively; and a connecting portion provided in the through hole and connected with the two damping portions.

12. The storage device according to claim 11, wherein each said elastic washer further comprises:

a plurality of spherical protrusions provided on the two damping portions respectively and protruding in a direction away from the connecting portion.

13. The storage device according to claim 8, wherein each said automatic door-opening device comprises:
   a motor configured to provide a driving force for opening the door body; and
   a side wall of the housing away from the box body is provided with at least one avoiding hole, and part of each said motor is provided in one said avoiding hole.

14. The storage device according to claim 13, wherein the automatic door-opening assembly further comprises:
   at least one sealing ring provided between the at least one avoiding hole and the at least one motor.

\* \* \* \* \*